United States Patent
Wurzburger et al.

[11] Patent Number: 6,096,222
[45] Date of Patent: Aug. 1, 2000

[54] AGENT TO REMOVE DISSOLVED CONTAMINANTS FROM WATER

[76] Inventors: Stephen R. Wurzburger, P.O. Box C, Goodyear's Bar, Calif. 95944; James Michael Overton, 1127 Nickel La., Yuba City, Calif. 95991

[21] Appl. No.: 09/257,076

[22] Filed: Feb. 24, 1999

[51] Int. Cl.$^7$ .................................................. C02F 1/463
[52] U.S. Cl. ..................... 210/713; 204/237; 204/249; 205/745; 205/751; 205/753; 210/717; 210/719; 210/747; 210/748; 210/170; 210/192; 210/195.3; 210/197; 210/205; 210/199; 210/207; 210/908; 210/909; 210/912
[58] Field of Search .............................. 204/237, 238, 204/248, 249; 205/745, 751, 753; 210/712, 713, 716, 717, 719, 721, 747, 748, 192, 170, 195.3, 197, 199, 198.1, 205, 207, 908, 909, 912; 252/175, 176; 423/138, 140

[56] References Cited

U.S. PATENT DOCUMENTS

| | | | |
|---|---|---|---|
| 3,461,067 | 8/1969 | Matsumoto et al. | 210/721 |
| 3,575,853 | 4/1971 | Gaughan et al. | 210/712 |
| 4,011,151 | 3/1977 | Ito et al. | 204/149 |
| 4,194,973 | 3/1980 | Smith | 210/721 |
| 4,675,112 | 6/1987 | Verde | 210/616 |
| 5,133,873 | 7/1992 | Catlin et al. | 210/715 |
| 5,266,213 | 11/1993 | Gillham | 210/747 |
| 5,298,170 | 3/1994 | Woog | 210/719 |
| 5,308,502 | 5/1994 | Brown | 210/724 |
| 5,679,259 | 10/1997 | Bolser | 210/719 |
| 5,698,107 | 12/1997 | Wurzburger et al. | 210/695 |
| 5,820,762 | 10/1998 | Bamer et al. | 210/661 |
| 5,868,941 | 2/1999 | Gillham et al. | 210/747 |
| 5,879,555 | 3/1999 | Khudenko | 210/615 |

*Primary Examiner*—Peter A. Hruskoci
*Attorney, Agent, or Firm*—Robert Samuel Smith

[57] ABSTRACT

An apparatus and method for removing hydrocarbon contaminants and heavy metal ion contaminants from wastewater stream comprising the introduction of iron ions into the stream. In one embodiment, the ions are introduced by applying an electrical current through a bed of iron particulates in the form of steel wool and iron nodules. In another embodiment, the iron salts are added to the waste stream and the iron ions are reduced to a more reactive lower valence state by electric current.

11 Claims, 1 Drawing Sheet

AGENT TO REMOVE DISSOLVED CONTAMINANTS FROM WATER

FIELD OF THE INVENTION

This invention relates to methods and apparatus for removing hydrocarbons and metals from water and particularly to the use of iron ions in multiple valence states that act as an oxidizing agent.

PRIOR ART AND INFORMATION DISCLOSURE

Contamination by toxic organic pollutants, food and food processing water is becoming an increasingly important environmental problem. The contaminants include unburned hydrocarbons from automobiles, benzene, MTBE as well as fuel leaking from underground tanks. These contaminants, often found in trace amounts, cannot be removed by present conventional water treatment systems. Some of these compounds are cancer causing (as in MTBE) at levels as low as 14 parts per billion.

They are generally water soluble and non-ionic and cannot be removed by any known filter-chemical flocculation or activated charcoal treatment system. In some areas, leaking of underground fuel tanks has contaminated the ground water causing wells to be shut off. Many of the organic and hydrocarbon compounds can be treated with bacteria or aeration. These treatments, however do not remove the most dangerous compounds.

While activated charcoal can be used on some fuel contamination, it can only absorb 10% by weight of contaminants so that it is very expensive. The used charcoal must either be regenerated (during which process, the charcoal loses a substantial fraction of absorption capacity with each regeneration) or be sent to a hazardous waste site for storage.

Processes for removal of organics containing heavy metals have been disclosed.

For example, U.S. Pat. No. 5,308,502 to Brown discloses a method for treating liquid wastes containing photoresist polymers and heavy metals which includes adding to the waste an aqueous solution of water soluble $Fe^{+3}$ and $Al^{+3}$ salts at a pH in the range from about 0.1 to 1.0 and a water soluble salt of $Mg^{+2}$ or $Ca^{+2}$. A precipitate containing the heavy metals and photoresist polymers is formed.

U.S. Pat. No. 5,820,762 to Bamer et al discloses a filtration method utilizing open mesh bags containing filtering media.

In the conventional wastewater treatment process utilizing oxidants, a mixed oxidant is generated in the system by adding chemical agent(s). In another approach, the oxidant is generated by the electrolytic production of chlorine and ozone. These systems require only electricity and common salt as the raw material.

For example, U.S. Pat. No. 4,761,208 discloses an electrolytic cell to generate a mixed stream of oxidants including chlorine compounds, ozone and hydrogen peroxide from common salt. This oxidant stream was originally developed as a sterilizing agent for use in treating drinking water.

These procedures of the prior art are costly and complex and are not effective in entirely removing trace amounts of the contaminants. Since the action of the filtering medium is absorption of the contaminating ions by the filtering medium, the life of the filtering medium is limited by the absorption capacity of the medium.

SUMMARY OF THE INVENTION

It is an object of this invention to remove contaminants more effectively and completely than is accomplished using the methods of the standard art.

It is another object of this invention to avoid the need to concentrate the waste streams and to avoid the use of activated charcoal.

It is still another object of this invention to provide an agent that is not characterized by the hazards associated with the use, storage and shipping of the acids, peroxides, ozones and chlorides that are presently used as oxidants.

It is another object of the invention to provide a system which conditions the contaminants to flocculate spontaneously with requiring the contaminants to be absorbed by a filtering medium that requires periodic replacement.

This invention is directed toward the generation of a very strong agent that will convert the organic or hydrocarbon contaminants to a precipitate form that can then be removed by flocculation. In this manner, the technique of this invention can be used to remove hydrocarbons and organics from the water medium that are otherwise virtually untreatable at the present time and which does not require frequent replacement of the filtering medium.

Although we do not wish to be bound by theory, it is believed that the agent created by the method of this invention is an iron ion (black iron indicative of $Fe^{+1}$) that leads to the destruction of one or more interatomic bonds in the organic or hydrocarbon contaminating molecule thereby converting the molecule to polyatomic ions that can then be removed by flocculation precipitation.

According to the present invention, the agent can be generated in three different ways, each way being most suitable for a different waste stream and flow rate, depending on concentration of the waste, flow rate, and number and type of contaminant.

In a first embodiment of the invention, applicable where flow rate of the waste stream and concentration is small, the waste steam is passed through a bed of finely divided iron selected from steel wool or iron nodules, or, where more practical, iron nodules are placed in a trench that is dug across the waste stream.

In a second embodiment of the invention where flow rate and concentration is moderate, an electrolytic cell or tank containing iron nodules is provided with two or more pairs of electrodes imbedded in the bed of nodules. The electrodes are preferably carbon. A small DC voltage is impressed between members of each pair.

In a third embodiment, applicable to larger flow rates and/or concentrations, a ferric salt (e.g., sulfate or chloride) is added to the waste stream which is then passed between electrodes, preferably iron or carbon. When the content of pollutants is large, the waste stream is passed through multiple (three) cells.

DESCRIPTION OF PREFERRED EMBODIMENTS

Figure 1:
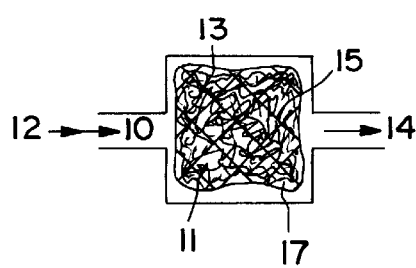
FIG. 1 shows the purifying agent of this invention positioned in a waste stream.

Turning now to a discussion of the drawings, FIG. 1 shows a sectional view of first embodiment for treating waste water in accordance with the invention. There is shown a waste water stream 10 flowing from a source 12 to a drain 14. through a receptacle 11 across the waste stream. The receptacle contains nodular iron 13 and/or steel wool iron 15.

When the steel wool 15 is positioned downstream from the bed of nodular iron 13, the steel wool 15 acts as a screen that prevents migration of the nodular iron 13 out of the bed of the receptacle 11. In one embodiment the nodular iron and/or steel wool is contained in an open mesh bag 17 which is conveniently placed in the receptacle and removed when the nodular iron and/or steel wool is fully charged with contaminant.

In one embodiment, the waste stream is is an open stream and the receptacle is an enlargement of the stream bed dug across the stream bed and holding the store of iron nodules and/or steel wool. The iron needs to be kept below thee surface of the water. The system will not perform until the iron oxidizes to form a black coating on the surfaces of the iron nodules.

Figure 2:
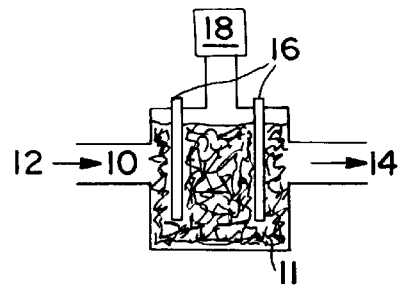
FIG. 2 shows electrodes extending into a bed of iron nodules.

FIG. 2 shows a second embodiment in which carbon electrodes 16 are placed in the iron bed. A low DC voltage from power supply 18 is impressed between the electrodes and the iron bed turns black after a period of a few hours to three days.

Figure 3:
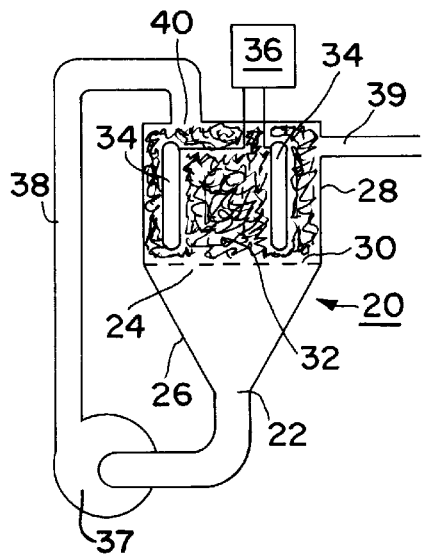
FIG. 3 shows a recirculating system provided with electrodes.

FIG. 3 is a sectional view of another embodiment showing a receptacle for the iron being a tank 20 with an exit 22 leading from a conical bottom 26 of the tank 20. The conical bottom is preferably polypropylene. A stainless steel plate 24 with punched holes 30 is positioned between the conical bottom 26 and the upper cylindrical tank section 28. A layer of steel wool 32 is positioned on top of the plate 24 which prevents iron nodules 13 from escaping through the apertures 30. A pair of electrodes 34 (preferably carbon) extends into the tank section 28. Each electrode 34 is connected to a DC voltage supply 36. A circulating pump 37 recirculates the waste stream through conduit 38 from the bottom exit 22 back to the entry 40 to the tank section 28. Treated water is drained from exit 39 to a clarification system where the contaminants are precipitated.

Figure 4A:
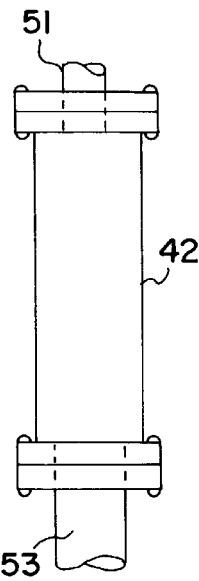
FIG. 4A shows a side view of a filter cartridge of the invention.
Figure 4B:
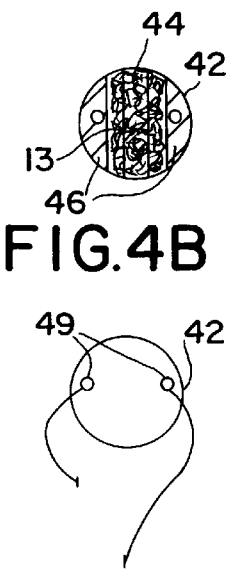
FIG. 4B shows a sectional view of FIG. 4A.
Figure 4C:
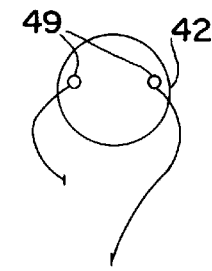
FIG. 4C shows connections to the cartridge of 4A.

FIG. 4A is a side view and FIG. 4B sectional view showing an arrangement of the invention particularly suitable for small waste streams. The receptacle is a cylindrical cartridge 42 holding iron nodules 13 with two electrodes 46. Waste water flows in the space between the electrodes 46. Untreated waste water enters through top conduit 51 and leaves by bottom conduit 53. FIG. 4C shows connections 49 from electrodes 46 to a voltage supply.

In practice, when no current is imposed between the electrodes the nodular iron and/or steel wool will turn black after about two weeks or longer and, in this condition, the iron bed is very effective in removing contaminants as discussed below. However, The conditioning process leading to most effective action of the iron bed in removing contaminants is greatly accelerated by application of DC voltage between the electrodes causing a small electrical current to flow through the bed.

Figure 5:
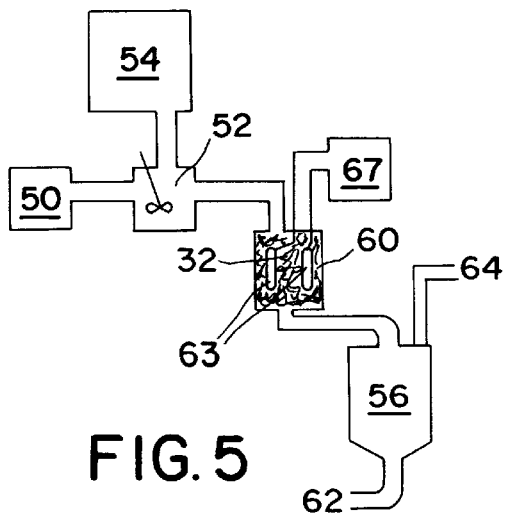
FIG. 5. shows an apparatus for treating the iron bed with a polarizing voltage.

FIG. 5 shows an arrangement of the invention including the source of waste water 50 connected to a chemical mixer 52 which is also fed by a tank of conditioning chemicals 54. The conditioning chemical is preferably ferric sulfate (or ferric chloride). The waste stream, containing ferric sulfate, then passes through a cell 60 which contains electrodes 63. The waste stream is subjected to an electric field by electrodes 63 connected to power supply 67. The stream then passes into clarifier 56 where precipitates containing contaminants settle out and pass through exit 62. Purified water is removed through exit 64 from the top of the clarifier 56.

Figure 6:
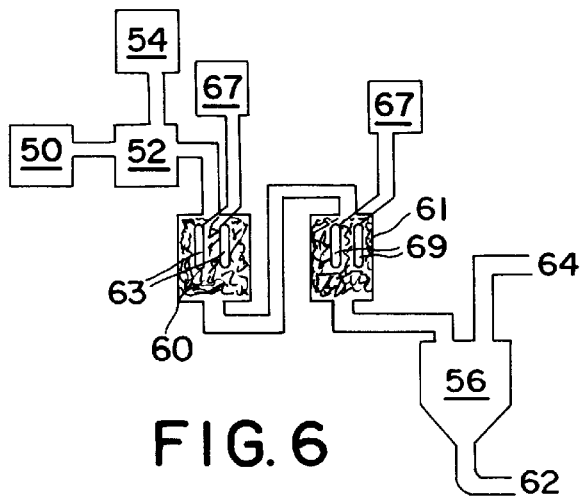
FIG. 6 shows a two stage apparatus for treatment with a polarizing voltage.

FIG. 6 shows an apparatus identical to the apparatus of FIG. 5 except that another reactor 61 having electrodes 69 connected to power supply 67 is shown connected to electrodes 69.

While we do not wish to be bound by theory, our belief about reactions that are occurring is based on color changes in the waste water as it passes through the various stages. The changes are from an initial dark brown to a light tan to a black. We believe that, in the first reactor 60, The dominant reaction is a reduction of the ferric ion, $Fe^{3+}$, to ferrous ion, $Fe^{2+}$, and, in the second reactor, to an easily reduced state between $Fe^{+2}$ and Fe which in the context of this specification, will be referred to as $Fe^{+1}$ (black iron) and is the activated agent that is very effective in oxidizing the contaminants as reported in the examples that follow.

EXAMPLE I

A solution of $Cr^{+6}$ and electroless Ni was poured into a tank and circulated through the bed of iron nodules. The nickel content was reduced to less than 5 ppm.

The waste solution was then circulated through the bed for one day and the concentration of $Cr^{+6}$ reduced to $Cr^{+3}$ less than 5 ppm in one day.

EXAMPLE II

A heavily contaminated water stream was located at a Northern California truck repair facility where fuel tankers are drained and washed out. The waste stream contained about 11% dissolved hydrocarbon contaminants after floating hydrocarbons were removed. The contaminants included gasoline, diesel, jet fuel and other hydrocarbons as shown by the analyses (before treatment) in table IA.

TABLE IA

CONTAMINANT CONTENT BEFORE TREATMENT

| | Analysis method | | | |
|---|---|---|---|---|
| 5M5520C | Total Oil and grease | 58,000 | mg/l | (parts per million) |
| SM5520F | Hydrocarbon Oil and grease | 53,000 | " | " |
| EPA 8015/DHS | Total Petroleum Hydrocarbons | 2,200,000 | μgms/l | " |
| 602 Volatile | Benzene | 5700 | μgms/l | |
| Aromatics | Chlorobenzene | ND | | |
| | 1,2-Dichlorobenzene | ND | | |

TABLE IA-continued

CONTAMINANT CONTENT BEFORE TREATMENT

Analysis method

| | | | | |
|---|---|---|---|---|
| 1,3-Dichlorobenzene | ND | | | |
| 1,4 Dichlorobenzene | ND | | | |
| Ethylbenzene | 14,000 | μgms/l | (parts per billion) | |
| Toluene | 52,000 | " | " | |
| Total Xylene Isomers | 88,000 | " | " | |
| Methyl Tert Butyl Ether | 460,000 | " | " | |

The wastewater was passed through a first reactor (FIG. 6) where 12 volts was applied between iron electrodes. The solution changed from a dark brown color to a tan color We believe the color change indicated that the ferric ion was reduced to ferrous ion in the first reactor. The waste water was then passed through the second reactor where the solution changed from a light tan color to a black color which we believe indicated a further reduction of the iron to a black iron. The black iron reacted with the hydrocarbons breaking them up so that they flocculated and were removable by filtration and/or settling.

TABLE IB

CONTAMINANT CONTENT AFTER TREATMENT

| | | | | |
|---|---|---|---|---|
| LUET Analysis | Total Oil and grease | ND | mg/l | (parts per million) |
| | Hydrocarbon Oil and grease | ND | | |
| 602 Volatile Aromatics billion) | Benzene | ND | μgms/l | (parts per |
| | 1,2 Dichlorobenzene | ND | | |
| | 1,3 Dichlorobenzene | ND | | |
| | 1,4 Dichlorobenzene | | | |
| | Ethylbenzene | ND | | |
| | Toluene | ND | | |
| | Total Xylene Isomers: | ND | | |
| | Methyl Tert Butyl Ether | 60 | μgms/l | (parts per billion) |

This treated waste stream satisfies a purity level that exceeds U.S. drinking water standards.

EXAMPLE III

EXAMPLE III was performed with the apparatus shown in FIG. 6 in which removal of contaminants was performed in two reactors connected in series. Referring to FIG. 6, Ferric sulfate was admitted to the chemical mixer 52 where it was mixed with the waste water coming in from waste water source 50 at a concentration 1 ppm ferric ion to 1 ppm of pollutant. The mixed stream was then admitted to a first reactor 60 containing carbon electrodes. A voltage of 12 volts was applied between the electrodes. Then the stream was admitted to a second reactor 61 containing iron electrodes with 25 volts between electrodes. Then the stream was admitted to a clarifier 62 where precipitates were formed and permitted to settle out and be drained through drain 64. Clear water was decanted from the top exit 66.

EXAMPLE IV

An acid waste stream from a large food preparation plant was found to have the following pollutant concentration.

TABLE II

| UNTREATED | |
|---|---|
| BOD | 21,700 mg/l |
| COD | 56,600 mg/l |
| SALT (as chlorides) | 2,090 mg/l |

Ferric chloride was dissolved in the waste stream at a concentration of 0.75 ppm ferric ion content to 1 ppm of dissolved pollutants.

The wastewater was then passed between iron electrodes of a first reactor having a voltage of twelve volts between electrodes. The waste water was a dark brown color going into the reactor and was a light tan coming out of the reactor which we believed indicated that the ferric ion was reduced to ferrous ion.

The wastewater was then passed between iron electrodes of a second reactor having a voltage of 25 volts between electrodes. The color of the solution turned from a light tan to a black color which we believed resulted from the ferrous iron being reduced still further to a state intermediate between $Fe^{+2}$ and Fe which, in the context of this specification is denoted as $Fe^{+1}$. Impurity concentration after this treatment is listed in the following table.

BOD - - - 2,020 MG/L

COD - - - not complete

SALT (as chlorides) - - - 523 mg/l

The waste stream was then passed between iron electrodes of a third reactor having 50 volts between electrodes and the following BOD content was measured.

AFTER THREE STAGE TREATMENT

BOD - - - 95 mg/l

The data shows a 99.5% reduction in BOD and a 75% reduction in salt (expressed as chlorides.

There has been described a system for removing hydrocarbon and heavy metal contaminants by continually adding to the waste stream an agent in the form of activated iron that convert the contaminants to a form that precipitate and can be removed by flocculation. Activated iron that enters the waste stream are also precipitated and are removed along with the precipitated contaminants. A reactor has been disclosed which controls the rate of entry of the activated iron into the waste stream. The reservoir of activated iron in the form of a bed of black particulate iron provides a very long life for the system without frequent activation of the medium as characterized by systems of the prior art. It is believed that the effectiveness of the system to remove BOTH hydrocarbons and heavy metal ions resides in reactions involving oxidation of the hydrocarbons and formation of heavy metal hydroxides by the reduction of the iron ions.

The foregoing examples illustrate the power of the method of the invention in removing contaminants from a waste water stream by mixing the stream with highly activated iron. In one embodiment, the iron is activated by providing the iron as nodules and passing electrical current through the bed. In another embodiment, the activated iron is generated by passing the waste stream mixed with ferric salts between energized electrodes. The use of the applied voltage to control the rate at which the iron ions form is an important factor in maximizing the efficiency of the process in terms of maximum purity of the water and life of the electrodes.

Variations and modification of the invention may be suggested by reading the specification and studying the drawings that are within the scope of the invention. I therefore wish to define the scope of my invention by the appended claims.

We claim:

1. A method for removing pollutants from a waste stream wherein said pollutants include at least one of hydrocarbon and metal salt contaminants, which includes the steps of:

providing a bed of finely divided iron in a receptacle;

finely divided iron in said bed being at least one of steel wool and iron nodules;

passing said waste stream into said receptacle containing said finely divided iron;

immersing a pair of carbon electrodes in said bed in said waste stream;

impressing a voltage between said electrodes;

whereby said finely divided iron in said receptacle is activated to form precipitates when said waste stream is passed through said receptacle and wherein said precipitates contain iron and said at least one of hydrocarbon and metal salt contaminants;

passing said waste stream through a filter whereby said precipitates are separated from decontaminated water.

2. The method of claim 1 wherein said step of impressing a voltage includes step of impressing a D. C. voltage between said electrodes.

3. The method of claim 2 wherein said step of impressing a voltage between said electrodes includes the step of impressing a voltage selected from a range between three to twelve volts.

4. The method of claim 1 wherein said receptacle is a trench and said method comprises the steps of placing said bed in said trench and passing said stream through said bed in said trench.

5. The method of claim 1 wherein said receptacle is a tank having an inlet and a first outlet with a circulating pump connected to pump a first portion of said waste stream from said first outlet back to said inlet and a second outlet from said tank arranged to permit passing from said tank a second portion of said waste stream being water from which said contaminants have settled and said method includes the steps in operable order:

passing said waste stream through said inlet into said tank;

pumping said stream from said first outlet and recirculating said stream back to said inlet until said stream has been substantially purified and passed out through said second outlet.

6. The method of claim 1 further including:

depositing a quantity of ferric salt in said receptacle with said waste stream.

7. The method of claim 6 wherein said ferric salt is selected from the group consisting of ferric chloride and ferric sulfate.

8. An apparatus for removing hydrocarbon contaminants and ionized heavy metal contaminants from a waste stream which comprises:

a receptacle holding a bed of finely divided iron;

said bed of finely divided iron being at least one of steel wool and iron nodules;

means for passing said waste stream through said bed;

carbon electrodes, each having an end immersed in said bed of finely divided iron and connected to a means for applying a voltage between said electrodes whereby said bed of finely divided iron is activated to provide iron ions which combine with said hydrocarbon contaminants and ionized heavy metal contaminants a are reduced to form precipitates providing that precipitation and flocculation of said hydrocarbon contaminants and heavy metal contaminants and iron occurs;

means for removing said hydrocarbon contaminants and heavy metal contaminants and iron that have precipitated and flocculated from water in said waste stream.

9. The apparatus of claim 8 which further comprises:

means for adding an aqueous solution of a ferric ion salt in said receptacle; and a means for mixing said aqueous solution in said waste stream which comprises:

a mixing tank communicating with said receptacle and said waste stream.

10. The apparatus of claim 9 wherein said ferric ion salt is selected from the group consisting of ferric chloride and ferric sulfate.

11. An apparatus for removing hydrocarbon contaminants and ionized heavy metal contaminants from a waste stream which comprises:

a receptacle containing water;

a bed of finely divided iron submerged in said receptacle being at least one of iron nodules and steel wool;

means for passing said waste stream through said bed, said bed having been submerged for a length of time sufficient to permit said bed of finely divided iron to turn black, and form precipitates with said hydrocarbon contaminants and said ionized heavy metal contaminants;

a pair of carbon electrodes submerged in said bed connectable to a source of d.c. voltage and means for removing said precipitates from said waste stream.

* * * * *